(12) United States Patent
Tseng (10) Patent No.: US 11,714,333 B2
(45) Date of Patent: Aug. 1, 2023

(54) OPTICAL IMAGING APPARATUS CAPABLE OF FOCUSING

(71) Applicant: LUXVISIONS INNOVATION LIMITED, New Territories (HK)

(72) Inventor: Cheng-Te Tseng, New Territories (HK)

(73) Assignee: GUANGZHOU LUXVISIONS INNOVATIONS TECHNOLOGY LIMITED, Guangzhou (CN)

( * ) Notice: Subject to any disclaimer, the term of this patent is extended or adjusted under 35 U.S.C. 154(b) by 232 days.

(21) Appl. No.: 16/992,996

(22) Filed: Aug. 13, 2020

(65) Prior Publication Data

US 2020/0371407 A1 Nov. 26, 2020

Related U.S. Application Data

(60) Provisional application No. 62/959,207, filed on Jan. 10, 2020, provisional application No. 62/886,376, filed on Aug. 14, 2019.

(30) Foreign Application Priority Data

Jun. 9, 2020 (TW) .................................. 109119370

(51) Int. Cl.
 *G03B 13/34* (2021.01)
 *G03B 5/04* (2021.01)
 (Continued)

(52) U.S. Cl.
 CPC ............... *G03B 13/34* (2013.01); *G03B 5/04* (2013.01); *G03B 5/06* (2013.01); *G03B 17/17* (2013.01);
 (Continued)

(58) Field of Classification Search
 CPC ............. G03B 13/34; G03B 5/04; G03B 5/06
 See application file for complete search history.

(56) References Cited

U.S. PATENT DOCUMENTS

| 2010/0182696 A1* | 7/2010 | Hasegawa | ............ G02B 27/646 359/557 |
| 2019/0103799 A1* | 4/2019 | Kawanabe | ............... G03B 3/10 |

(Continued)

FOREIGN PATENT DOCUMENTS

| CN | 107357114 A | 11/2017 |
| CN | 105556385 B | 9/2019 |

(Continued)

*Primary Examiner* — Minh Q Phan
(74) *Attorney, Agent, or Firm* — Birch, Stewart, Kolasch & Birch, LLP (57) ABSTRACT

An optical imaging apparatus capable of focusing is provided. The apparatus includes a lens assembly and an imaging sensing component. The lens group includes a stabilization component and a focusing component. The stabilization component has an optical axis and includes a first optical lens group and a driving element. The driving element is configured to drive the first optical lens group to move on a plane perpendicular to the optical axis or to rotate around the optical axis. The focusing component is fixed to the stabilization component and includes a second optical lens group. The second optical lens group is aligned with the optical axis. The image sensing component is fixed to one end of the lens group and is aligned with the optical axis.

14 Claims, 5 Drawing Sheets

(51) Int. Cl.
　　　*G03B 5/06*　　　　(2021.01)
　　　*H04N 23/51*　　　(2023.01)
　　　*H04N 23/55*　　　(2023.01)
　　　*H04N 23/69*　　　(2023.01)
　　　*G03B 17/17*　　　(2021.01)

(52) U.S. Cl.
　　　CPC .............. *H04N 23/51* (2023.01); *H04N 23/55* (2023.01); *H04N 23/69* (2023.01); *G03B 2205/0015* (2013.01); *G03B 2205/0023* (2013.01)

(56) References Cited

U.S. PATENT DOCUMENTS

2019/0243112 A1　　8/2019　Yao et al.
2020/0218082 A1*　7/2020　Choi .................... H04N 5/2328

FOREIGN PATENT DOCUMENTS

JP　　　　2016057386 A　*　4/2016
WO　　WO-2017037688 A1　*　3/2017　............. G02B 27/64

* cited by examiner

OPTICAL IMAGING APPARATUS CAPABLE OF FOCUSING

CROSS-REFERENCES TO RELATED APPLICATIONS

This application claims the priority benefit of U.S. provisional application Ser. No. 62/886,376, filed on Aug. 14, 2019, U.S. provisional application Ser. No. 62/959,207, filed on Jan. 10, 2020, and Patent Application No. 109119370 filed in Taiwan, R.O.C. on Jun. 9, 2020. The entirety of the above-mentioned patent applications are hereby incorporated by references herein and made a part of the specification.

BACKGROUND

Technical Field

The present disclosure relates to an optical imaging apparatus configured to perform shooting and/or video recording, and in particular, to an optical imaging apparatus capable of focusing.

Related Art

Most mobile devices such as a mobile phone or a tablet are equipped with an optical imaging apparatus capable of focusing that can be used to take a picture or to film. In addition to the foregoing devices, the optical imaging apparatus capable of focusing may further be applied to devices having shooting needs such as a notebook computer, an unmanned aerial vehicle, a monitoring system, a display, and a camera.

With the increasing demands of consumers for the photograph/filming function of the camera device, it is hoped that the optical imaging apparatus capable of focusing in the mobile device can have a better imaging effect.

SUMMARY

Based on the foregoing demands, according to some embodiments of the present disclosure, the present disclosure provides an optical imaging apparatus capable of focusing, which has an optical image stabilization (OIS) function through a plurality of specific lens structures of the apparatus to meet requirements of a relatively high-specification mobile apparatus.

According to some embodiments, the present disclosure provides an optical imaging apparatus capable of focusing including a lens group and an image sensing component. The lens group includes a stabilization component and a focusing component. The stabilization component has an optical axis and includes a first optical lens group and a driving element. The driving element is configured to drive the first optical lens group to move on a plane perpendicular to the optical axis or to rotate around the optical axis. The focusing component is fixed to the stabilization component and includes a second optical lens group. The second optical lens group is aligned with the optical axis. The image sensing component is fixed to one end of the lens group and is aligned with the optical axis.

According to some embodiments of the present disclosure, the optical imaging apparatus capable of focusing further includes an optical path changing element, where the optical path changing element is disposed at one end of the lens group away from the image sensing component and is configured to change an image capturing direction of the optical imaging apparatus capable of focusing.

According to some embodiments of the present disclosure, the optical path changing element is a reflective sheet, an included angle between the reflective sheet and the image capturing direction being substantially the same as an included angle between the optical axis and the reflective sheet.

According to some embodiments of the present disclosure, the optical path changing element is a prism, the prism having a light incident surface and a light emitting surface. The light incident surface is perpendicular to the image capturing direction, and the light emitting surface is perpendicular to the optical axis.

According to some embodiments of the present disclosure, the optical imaging apparatus capable of focusing further includes an assembly housing, where the optical path changing element and the stabilization component are disposed in the assembly housing.

According to some embodiments of the present disclosure, the second optical lens group is a movable optical lens group, and the focusing component further includes an actuating element, the movable optical lens group being disposed in the actuating element, the actuating element being configured to actuate at least one movable optical lens in the movable optical lens group to move along the optical axis.

According to some embodiments of the present disclosure, the second optical lens group is a fixed optical lens group.

According to some embodiments of the present disclosure, the driving element is further configured to drive the first optical lens group to move along the optical axis.

According to some embodiments of the present disclosure, the focusing component further includes an actuating element, a third optical lens group, and a frame body. The second optical lens group is a movable optical lens group, and the movable optical lens group is disposed in the actuating element. The actuating element is configured to actuate at least one movable optical lens in the movable optical lens group to move along the optical axis. The third optical lens group is aligned with the optical axis and is a fixed optical lens group. The fixed optical lens group is fixed to the frame body, and the frame body is fixed to the actuating element.

According to some embodiments of the present disclosure, the size of each lens in the movable optical lens group is less than the size of each lens in the fixed optical lens group.

According to some embodiments of the present disclosure, the movable optical lens group and the fixed optical lens group are disposed in a single housing.

According to some embodiments of the present disclosure, the focusing component is located between the stabilization component and the image sensing component.

According to some embodiments of the present disclosure, the stabilization component is located between the focusing component and the image sensing component.

According to some embodiments of the present disclosure, the image sensing component includes an image sensor, a filter, and a fixing frame, the image sensor and the filter being fixed to the fixing frame, and the filter being configured to filter a light ray toward the image sensor along the optical axis.

BRIEF DESCRIPTION OF THE DRAWINGS

The disclosure will become more fully understood from the detailed description given herein below for illustration only, and thus not limitative of the disclosure, wherein.

DETAILED DESCRIPTION

The following provides detailed descriptions of various embodiments. However, the embodiments are merely used as an example for description and are not intended to narrow the protection scope of the invention. In addition, some elements may be omitted in the drawings in the embodiments, to clearly show technical features of the present disclosure.

Figure 1A:
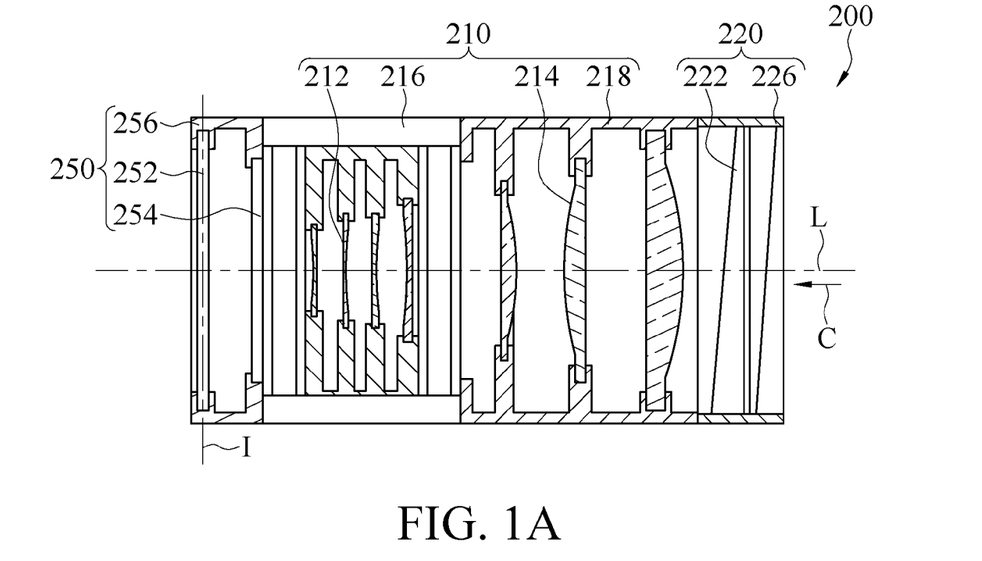
FIG. 1A is a schematic structural diagram of an optical imaging apparatus capable of focusing according to some embodiments.

Referring to FIG. 1A, FIG. 1A is a schematic structural diagram of an optical imaging apparatus 200 capable of focusing according to some embodiments. In some embodiments, the optical imaging apparatus 200 capable of focusing includes a lens group and an image sensing component 250, the image sensing component 250 being fixed to one end of the lens group. The lens group and the image sensing component 250 are aligned with each other along an optical axis L (that is, an optical axis of the lens group passing through a central area of the image sensing component 250). The lens group may include at least two lens sub-groups. The lens sub-groups refer to different sub-groups of lenses divided based on a function, a structure, a size, weight or other features. Lenses of each sub-group are disposed in a corresponding accommodating/fixing structure of the sub-group. The accommodating/fixing structure may be a lens barrel, a housing, a substrate, etc. Alternatively, the accommodating/fixing structure is a part of a driving element or an actuating element, such as a motor. In this embodiment, the lens group includes a focusing component 210 and a stabilization component 220. In some embodiments, the stabilization component 220 includes a first optical lens group, and the focusing component 210 includes a second optical lens group for focusing. The first optical lens group is a stabilizing optical lens group for optical image stabilization, and the second optical lens group is a movable optical lens group for autofocus (AF), or is a fixed optical lens group for fixed-focus (FF). In some embodiments, the focusing component 210 may include two lens groups, such as the second optical lens group and a third optical lens group. In some embodiments, the second optical lens group is a movable optical lens group for autofocus (AF), and the third optical lens group is a fixed optical lens group for fixed-focus (FF).

Optical axes of lens sub-groups in the lens group may be aligned with each other. For example, an optical axis of the first optical lens group in the stabilization component 220 and an optical axis of the second optical lens group in the focusing component 210 overlap with each other. In this case, it may also be said that the second optical lens group is aligned with the optical axis of the first optical lens group.

In some embodiments, the optical imaging apparatus 200 capable of focusing may be applied to apparatuses with a shooting function such as a smart phone, a tablet computer, a notebook computer, a display, a stand-alone camera, and an aerial camera. In some embodiments, the stabilization component 220, the focusing component 210, and the image sensing component 250 are arranged in this order. That is, the focusing component 210 is located between the stabilization component 220 and the image sensing component 250. For example, in the embodiment shown in FIG. 1A, when light travels along an image capturing direction C on the optical axis L, the light sequentially passes through the stabilization component 220, the focusing component 210, and then is projected onto the image sensing component 250. In addition, positions of the stabilization component 220, the focusing component 210, and the image sensing component 250 are relatively fixed. In some other embodiments, the focusing component 210, the stabilization component 220, and the image sensing component 250 may also be arranged in this order, that is, the stabilization component 220 is located between the focusing component 210 and the image sensing component 250. Generally, a back focal length (BFL) (that is, a distance from a last lens of the optical lens group closest to the image sensing component to the image sensing component) is needed for an optical lens group, and a telephoto lens usually required a longer back focal length. Therefore, in some embodiments, when the stabilization component 220 is located between the focusing component 210 and the image sensing component 250 and a length of the stabilization component 220 is suitable, the installation of the stabilization component 220 utilizes a space of the back focal length of the focusing component 210, thereby achieving a better space utilization rate. However, regardless of an arrangement order of the components through which the light passes, the incident light is finally imaged on the image sensing component 250 (located at an end of the optical path).

The focusing component 210 may include a plurality of optical lenses (sometimes referred to "lenses" for short in the following), an actuating element 216, and a frame body 218. The optical lens is disposed along the optical axis L to capture an image toward the image capturing direction C, which may also be regarded as an incident direction of light from a subject along the optical axis L, and the light is imaged on an imaging plane I. In this embodiment, the focusing component 210 includes a second optical lens group and a third optical lens group, that is, a plurality of optical lens areas may be divided into the second optical lens group and the third optical lens group. The third optical lens group is a fixed optical lens group 214, and the second optical lens group is a movable optical lens group 212 (it should be noted that a number of lenses in each group is not limited in the number shown in FIG. 1A). The actuating element 216 and the frame body 218 are relatively stationary. In some embodiments, the actuating element 216 is directly fixed to the frame body 218. The fixed optical lens group 214 is fixed to the frame body 218, and the movable optical lens group 212 is fixed to the actuating element 216 and may be driven by the actuating element 216 to move relative to the fixed optical lens group 214. More particular, the actuating element 216 may actuate the movable optical lens group 212 to move back and forth along the optical axis L, so that an image of an object can be focused and imaged on the imaging plane I.

In some embodiments, the focusing component 210 has only a sleeve-shaped housing (or lens barrel). Generally, only one or more lenses are disposed in the lens barrel, and no actuating element is disposed in the lens barrel. In this case, the fixed optical lens group 214 is fixed to an inner wall of the lens barrel. The lens barrel can be seen as the frame body 218, and the movable optical lens group 212 is movably disposed in the actuating element 216. Therefore, a number of to-be-assembled elements are reduced by using this structure, thereby facilitating the entire assembly process of the optical imaging apparatus. In some embodiments, the movable optical lens group 212 and the fixed optical lens group 214 are disposed in corresponding lens barrels of the moveable optical lens group and the fixed optical lens group, respectively. The lens barrel of the movable optical lens group 212 is disposed in the actuating element 216. In some embodiments, the frame body 218 is a lens barrel accommodating the fixed optical lens group 214, and the frame body 218 is connected to the housing portion of the actuating element 216.

In some embodiments, grouping method of the optical lenses is to group lighter-weight optical lenses into the movable optical lens group 212. In this situation, the required driving force of the corresponding actuating element 216 is relative low, and thus an overall size of the actuating element 216 can be reduced. In some embodiments, sizes (e.g. lens diameters) of a plurality of optical lenses in an optical lens group applicable to a long focal length (telephoto) are sequentially reduced, so that the optical lens or lenses at the imaging end has/have lighter weight. In this case, an optical lens or lenses near the imaging end may be selected as the movable optical lens group 212, that is, the movable optical lens group 212 is located between the fixed optical lens group 214 and the imaging plane I, and the weight (or the size) of any lens in the movable optical lens group 212 is less than the weight (or the size) of any lens in the fixed optical lens group 214. In some embodiments, at least one lens in the movable optical lens group 212 has the weight less than the weight of one lens in the fixed optical lens group 214. It should be understood that a selection method of the movable optical lens group 212 mentioned here is only one of the solutions, and the grouping method of the optical lenses may be performed in a reverse manner. In other words, in some embodiments, the optical lens near the imaging end has greater weight, or at least one lens in the movable optical lens group 212 has the greater weight than the weight of one lens in the fixed optical lens group 214, or any lens in the movable optical lens group 212 has the weight greater than the weight of any lens in the fixed optical lens group 214.

Still referring to FIG. 1A, the stabilization component 220 includes a first optical lens group and a driving element 226. In this embodiment, the first optical lens group is a stabilizing optical lens group 222. The stabilizing optical lens group 222 is fixed to the driving element 226. The driving element 226 drives the stabilizing optical lens group 222 to move. In some embodiments, the driving element 226 may drive a lens in the stabilizing optical lens group 222 to be displaced in a plane perpendicular to the optical axis L or to rotate around the optical axis L. In some embodiments, the stabilizing optical lens group 222 includes a plurality of wedge prisms (whose lens profile is trapezoidal), and the driving element 226 drives the stabilizing optical lens group 222 to rotate, so as to perform vibration compensation. That is, the stabilization component 220 may have an OIS function. In this embodiment, the stabilization component 220 and the focusing component 210 are divided into different lens groups. The driving element 226 and the actuating element 216 thereby correspond to the stabilization component 220 and the focusing component 210, respectively, so that structures of the driving element 226 and the actuating element 216 may be simplified.

In an embodiment shown in FIG. 1A, a plurality of wedge prisms of the stabilizing optical lens group 222 may change an optical path of incident light through relative rotation, and compensate a displacement of the optical path caused by the vibration, so that the optical path of the incident light (can also be referred as "optical path" for short) may be continuously aligned with the optical axis L, thereby achieving the OIS function. In some embodiments, the stabilizing optical lens group 222 includes a lens group that may change the optical path, for example, refractive indexes of areas on one or more lenses in the lens group that may change the optical path can be different. In addition, the driving element 226 may drive the one or more lenses to shift in a plane perpendicular to the optical axis L or rotate around the optical axis L, so that specific areas with different refractive indexes of the one or more lenses are aligned with each other, thereby changing the optical path by causing the incident light to pass through the areas with different refractive indexes so as to compensate for the displacement of the optical path caused by the vibration, and thus the optical path can be continuously aligned with the optical axis L, thereby achieving the OIS function.

The foregoing optical lens may be a liquid crystal lens, a liquid lens, and a T lens, etc. The liquid lens may be a rotating liquid lens, a hydrophobic liquid lens, and a hydraulic liquid lens.

In some embodiments, the stabilization component 220 further includes a sensor and a controller. The sensor senses movement or vibration of the optical imaging apparatus 200 capable of focusing, and the controller drives, according to a movement or vibration signal returned by the sensor, the driving element 226 to perform vibration compensation. In some embodiments, the sensor, the controller, and the stabilization component 220 may be disposed as a same component. In some embodiments, the sensor, the controller, and the stabilization component 220 are not disposed as the same component. The sensor and the controller may be disposed on a substrate other than disposed in the optical imaging apparatus 200 capable of focusing, and electrically connected to the stabilization component 220 through a circuit on the substrate and/or a flexible circuit board.

Still referring to FIG. 1A, in this embodiment, the image sensing component 250 includes an image sensor 252, a filter 254, and a fixing frame 256. The image sensor 252 is further electrically connected to a circuit board (not shown in FIG. 1A). In some embodiments, the image sensor 252 and the filter 254 are fixed to the fixing frame 256. In some embodiments, the filter 254 may be directly fixed to the image sensor 252. For example, the filter 254 may be glued on the image sensor 252, in the case that the light ray of a subject passes through the filter 254 first and then reaches the image sensor 252.

The filter 254 filters light rays entering the image sensor 252. In particular, the filter 254 allows the light used for imaging on the image sensor 252 to pass therethrough, while the other light cannot pass the filter 254. For example, when the optical imaging apparatus 200 capable of focusing is applied to shoot a portrait or a landscape, the filter 254 allows visible light (such as light with a wavelength of 380 nm to 780 nm) to pass, and blocks the other light. In some embodiments, the filter 254 may be blue glass, an infrared filter (IR Filter), or an infrared ultraviolet cut filter (UV-IR cut filter). When the optical imaging apparatus 200 capable of focusing is applied to an infrared night vision device, the filter 254 may be a filter that allows infrared light to pass, and blocks the other light.

As previously described, the stabilization component 220, the focusing component 210, and the image sensing component 250 are sequentially arranged and relatively stationary. In an embodiment shown in FIG. 1A, the fixing frame 256 is fixed to the actuating element 216. The actuating element 216 is fixed to the frame body 218, and the frame body 218 is fixed to the driving element 226. In some embodiments, the optical imaging apparatus 200 capable of focusing has a main housing. The fixing frame 256, the actuating element 216, the frame body 218, and the driving element 226 are fixed in the main housing, respectively, so that the stabilization component 220, the focusing component 210, and the image sensing component 250 are relatively stationary. In some embodiments, the fixing frame 256, the actuating element 216, the frame body 218, and the driving element 226 are fixed on a substrate. In some embodiments, the focusing component 210 only includes a fixed optical lens group 214. A frame body 218 of the fixed optical lens group 214 may be fixed on the substrate, the stabilization component 220 may be connected to the frame body 218, and the stabilization component 220 may not be fixed on the substrate. In some embodiments, the focusing component 210 may only include a movable optical lens group 212. The movable optical lens group 212 is disposed in the actuating element 216. The actuating element 216 may be fixed on the substrate, and the stabilization component 220 and the image sensing component 250 may be connected to the actuating element 216 and are not fixed to the substrate. In some embodiments, the focusing component 210 includes the movable optical lens group 212 and the fixed optical lens group 214. The frame body 218 of the fixed optical lens group 214 may be fixed on the substrate, and the stabilization component 220 and the actuating element 216 may be connected to the frame body 218.

The actuating element 216 and the driving element 226 may be a voice coil motor (VCM), a shape memory alloys (SMA) motor, a piezo motor, or a stepper motor. For example, when the actuating element 216 is a voice coil motor, a number of coils in the voice coil motor may be configured according to requirements, so that the movable optical lens group 212 may uniaxially move along an optical axis L to perform focusing.

Figure 1B:
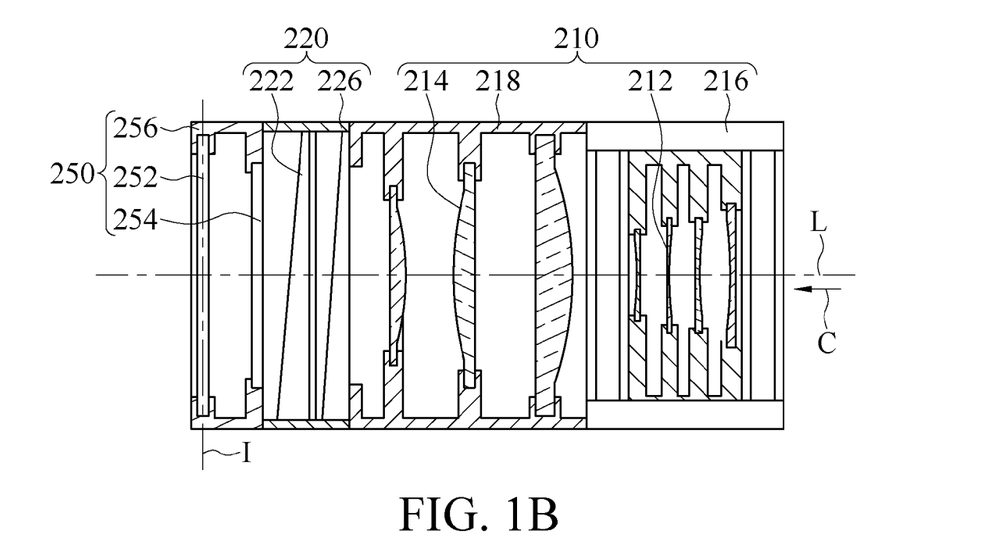
FIG. 1B is a schematic structural diagram of an optical imaging apparatus capable of focusing according to some embodiments.
Figure 1C:
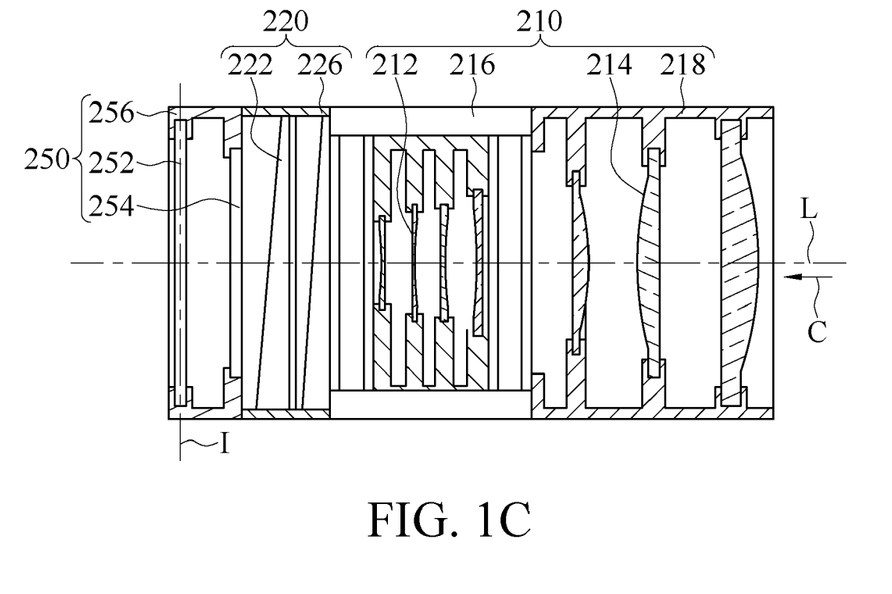
FIG. 1C is a schematic structural diagram of an optical imaging apparatus capable of focusing according to some embodiments.
Figure 1D:
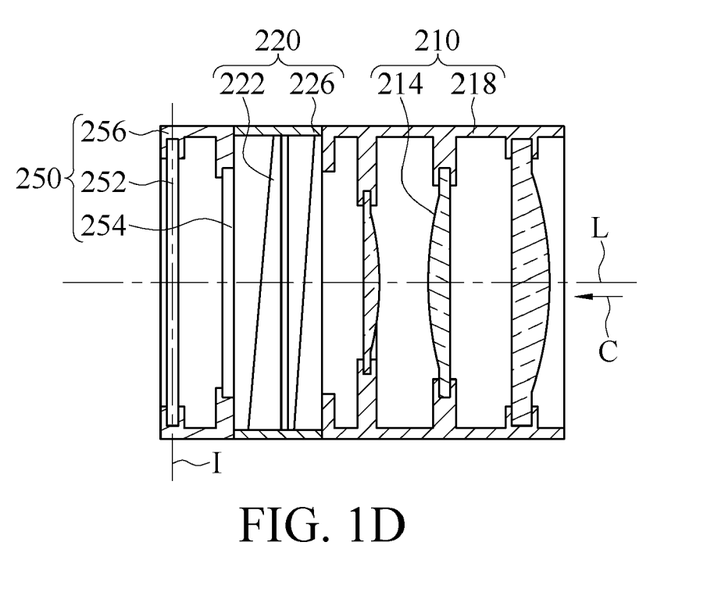
FIG. 1D is a schematic structural diagram of an optical imaging apparatus capable of focusing according to some embodiments.

In some embodiments, as shown in FIG. 1B to FIG. 1D, the stabilization component 220 may be disposed between the focusing component 210 and the image sensing component 250. In other words, when light travels along an image capturing direction C on the optical axis L as shown in FIG. 1B, the light sequentially passes through the focusing component 210 and the stabilization component 220, and then is projected onto the image sensing component 250. Positions of the focusing component 210, the stabilization component 220, and the image sensing component 250 are still relatively stationary even when the movable optical lens group 212 moves. For example, a driving element 226 in the stabilization component 220 may be indirectly fixed to an actuating element 216, and a fixing frame 256 of the image sensing component 250 is fixed to the driving element 226. Alternatively, when the focusing component 210 has a sleeve-shaped housing (barrel). For example, when a fixed optical lens group 214 is fixed in an inner wall of the sleeve-shaped housing (for example, a frame body 218), a driving element 226 in the stabilization component 220 may be fixed to the sleeve-shaped housing (e.g. the frame body 218).

In some embodiments, as shown in FIG. 1B or FIG. 1C, the stabilization component 220 may be disposed between the focusing component 210 and the image sensing component 250. The focusing component 210 has a fixed optical lens group 214 and a frame body 218, a movable optical lens group 212, and an actuating element 216. In some embodiments, as shown in FIG. 1B, in the focusing component 210, the fixed optical lens group 214 is closer to the image sensing component 250 than the movable optical lens group 212. In this case, a driving element 226 in the stabilization component 220 may be fixed to the sleeve-shaped housing (for example, the frame body 218). In some other embodiments, as shown in FIG. 1C, in the focusing component 210, the fixed optical lens group 214 is farther away from the image sensing component 250 than the movable optical lens group 212. In this case, the driving element 226 in the stabilization component 220 may be fixed to the actuating element 216.

In some embodiments, as shown in FIG. 1D, a stabilization component 220 may be disposed between a focusing component 210 and an image sensing component 250, and the focusing component 210 only includes a fixed optical lens group 214 and a frame body 218. In other words, the focusing component 210 itself does not have an autofocus (AF) function. In this case, a driving element 226 of the stabilization component 220 may further drive one or more lenses in a first optical lens group to move along an optical axis L. In other words, the stabilization component 220 has the AF function in addition to an OIS function. Similarly, in some embodiments, the focusing component 210 may be disposed between the stabilization component 220 and the image sensing component 250, and the focusing component 210 only includes a fixed optical lens group 214 and a frame body 218. In this case, a driving element 226 of the stabilization component 220 may further drive one or more lenses in the first optical lens group to move along an optical axis L to achieve the AF function. However, it should be understood that in some embodiments, when the focusing component 210 has a movable optical lens group 212 and an actuating element 216, the driving element 226 of the stabilization component 220 may still drive one or more lens in the first optical lens group to move along the optical axis L, so as to cooperate with the movable optical lens group 212. In some embodiments, neither the focusing component 210 nor the stabilization component 220 may have the function of autofocus (AF), that is, the optical imaging apparatus 200 capable of focusing is a fixed-focus (FF) imaging apparatus with an OIS function.

In some embodiments, the stabilization component 220, the focusing component 210, and the image sensing component 250 are separable components, respectively, to better facilitate assembly and disassembly, and management of the components are more flexible during material management.

Therefore, in the embodiments shown in FIG. 1A to FIG. 1D, the optical imaging apparatus 200 capable of focusing may have a telephoto and/or stabilization function, so as to meet demands of a high-specification mobile apparatus. Moreover, since the configuration of the fixed optical lens group 214 and the movable optical lens group 212 is properly configured, the overall weight can be reduced, thereby conforming to the trend of thinning and lightening.

Figure 3A:
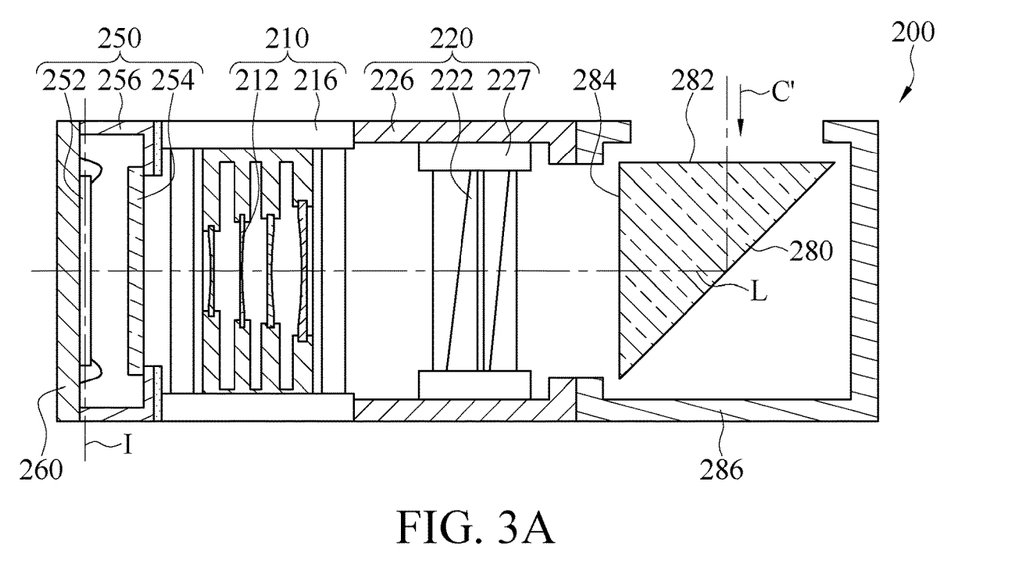
FIG. 3A is a schematic structural diagram of an optical imaging apparatus capable of focusing according to some embodiments.
Figure 3B:
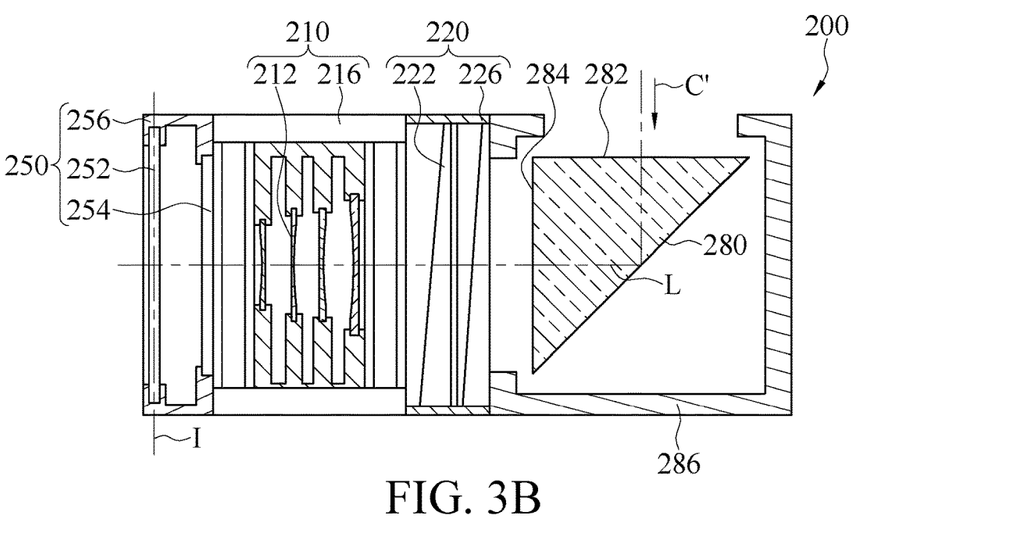
FIG. 3B is a schematic structural diagram of an optical imaging apparatus capable of focusing according to some embodiments.

In some embodiments, the focusing component 210 of the optical imaging apparatus 200 capable of focusing may only include the movable optical lens group 212 and the actuating element 216 (referring to FIG. 3B). Accordingly, the overall volume and weight of the optical imaging apparatus 200 capable of focusing are reduced, and a length thereof along the optical axis L is also shortened, so that a mobile device equipped with the optical imaging apparatus 200 capable of focusing may better meet the requirements of thinning. In some embodiments, when the focusing component 210 has a housing, only the movable optical lens group 212 and the actuating element 216 may be in the housing, and there is no fixed optical lens group 214 in the housing.

In some embodiments, the focusing component 210 of the optical imaging apparatus 200 capable of focusing may only include the fixed optical lens group 214 to reduce the overall weight similarly, meeting the requirements of thinning. In other words, in some embodiments, when the focusing component 210 has a housing, only the fixed optical lens group 214 may be fixed to the housing, and there is no movable optical lens group 212 or actuating element 216 in the housing. In this case, the driving element 226 of the stabilization component 220 may further drive one or more lenses in the first optical lens group to move along the optical axis L to achieve the AF function.

Figure 2:
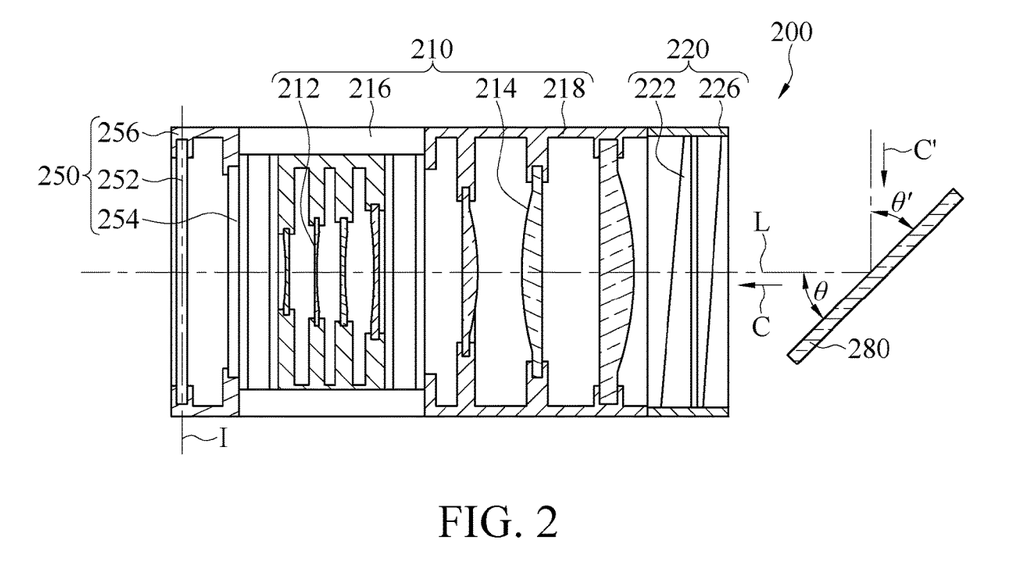
FIG. 2 is a schematic structural diagram of an optical imaging apparatus capable of focusing according to some embodiments.

Referring to FIG. 2, FIG. 2 is a schematic structural diagram of an optical imaging apparatus capable of focusing according to some embodiments. The optical imaging apparatus 200 capable of focusing includes an image sensing component 250, a lens group, and an optical path changing element 280. The lens group includes a focusing component 210 and a stabilization component 220. The optical path changing element 280 is disposed at the other end of the lens group away from the image sensing component 250. The optical path changing element 280 is configured to change an image capturing direction of the optical imaging apparatus 200 capable of focusing. The optical path changing element 280 may be combined with the optical imaging apparatus 200 capable of focusing of any of the foregoing embodiments. In this embodiment, the optical path changing element 280, the stabilization component 220, the focusing component 210, and the image sensing component 250 are arranged in sequence. In some embodiments, the light path changing element 280, the focusing component 210, the stabilization component 220, and the image sensing component 250 may be arranged in this sequence, that is, the stabilization component 220 is located between the focusing component 210 and the image sensing component 250.

The optical path changing element 280 is located in an image capturing direction C of the plurality of optical lenses, and is configured to change a light ray travelling along an actual image capturing direction C' to the image capturing direction C. In other words, the optical imaging apparatus 200 capable of focusing may be configured as a periscope structure, so that an image capturing direction C of the plurality of optical lenses is not required to be configured along a thickness direction of an electronic device, which is beneficial to apply the optical imaging apparatus 200 capable of focusing to a thin and light electronic device. In this embodiment, the optical path changing element 280 is fixed, and an OIS function may be achieved only by the stabilization component 220, so that a structure of the optical path changing element 280 may further be simplified. In some other embodiments, the optical path changing element 280 may further be movable, and the optical path changing element 280 may cooperate with the stabilization component 220 to jointly generate the OIS function. For example, the optical path changing element 280 cooperates with the stabilization component 220 to jointly generate the OIS function on different axes.

In an embodiment shown in FIG. 2, the optical path changing element 280 is a reflective sheet, and forms an included angle θ with the image capturing direction C. An included angle between the image capturing direction C and the reflective sheet is substantially the same as an included angle θ' between an actual image capturing direction C' and the reflective sheet, so that a light ray from the actual image capturing direction C' may be redirected towards the image capturing direction C by being reflected, so as to pass through the stabilizing optical lens group 222, the fixed optical lens group 214, the movable optical lens group 212, and the filter 254, and to be imaged on the image sensor 252.

In some embodiments, the light path changing element 280 is a prism (as shown in FIG. 3A and FIG. 3B). The prism has a light incident surface 282 and a light emitting surface 284. The light incident surface 282 faces an actual image capturing direction C'. The light emitting surface 284 faces the stabilizing optical lens group 222. There is an included angle between the light incident surface 282 and the light emitting surface 284 to change the light ray travelling along the actual image capturing direction C' to the image capturing direction C. In some embodiments, the light emitting surface 284 is perpendicular to the optical axis L, and the light incident surface 282 may be perpendicular to the actual image capturing direction C' as well.

Referring to both FIG. 3A and FIG. 3B, FIG. 3A and FIG. 3B are schematic structural diagrams of an optical imaging apparatus capable of focusing according to some embodiments. FIG. 3A and FIG. 3B show similar embodiments. The optical imaging apparatus 200 capable of focusing respectively includes an image sensing component 250, a focusing component 210, a stabilization component 220, and an optical path changing element 280. The focusing component 210 includes a movable optical lens group 212 and an actuating element 216. The stabilization component 220 includes a stabilizing optical lens group 222 and a driving element 226. The optical path changing element 280, the stabilization component 220, the focusing component 210, and the image sensing component 250 are sequentially arranged and are relatively stationary.

In an embodiment shown in FIG. 3A, the stabilization component 220 may include a lens barrel 227. A stabilizing optical lens group 222 is disposed in the lens barrel 227, and the lens barrel 227 may be disposed in the driving element 226. In these embodiments, the actuating element 216 of the focusing component 210 may be fixed on the driving element 226. In an embodiment shown in FIG. 3B, the stabilizing component 220 does not have the lens barrel 227.

In some embodiments, the focusing component 210 and the image sensing component 250 are fixed to each other by an adhesive. In some embodiments, the adhesive is a two-stage curing adhesive, such as but not limited to, that fixing in the first stage is to irradiate the adhesive with ultraviolet (UV) to achieve temporary fixing; and that fixing in the second stage is to perform heating and baking to achieve permanent fixation. By using such an adhesive, when the focusing component 210 and the image sensing component 250 are assembled, alignment between an optical lens group of the focusing component 210 and an image sensor 252 of the imaging sensing component 250 may be adjusted in an active alignment (AA) method. In addition, in some embodiments, the stabilization component 220 and the focusing component 210 may further be fixed to each other by using the two-stage adhesive in the active alignment method (not shown in FIG. 3A and FIG. 3B).

In an embodiment shown in FIG. 3A, the image sensor 252 is fixed and electrically connected to a circuit board 260. In the embodiment of FIG. 3A, the image sensor 252 is electrically connected to the circuit board by wire bonding, a fixing frame 256 is fixed to the circuit board 260, and a filter 254 is fixed to the fixing frame 256. In an embodiment shown in FIG. 3B, the image sensor 252 is electrically connected to the circuit board (not shown), and a main plane (back surface) of the image sensor 252 may be attached or bonded to the circuit board or be perpendicular to the circuit board. In some embodiments, the image sensor 252 is attached to a sub-circuit board, and the image sensor 252 and the sub-circuit board are vertically disposed on a main circuit board. Alternatively, the image sensor 252 is disposed in a suitable frame. The frame may be vertically disposed on the main circuit board and connected to the main circuit board through a connecting circuit (such as a flexible circuit board).

In the embodiment of FIG. 3A and FIG. 3B, the focusing component 210 only has a movable optical lens group 212, so that an overall volume and weight of the optical imaging apparatus 200 capable of focusing are reduced, and a length thereof along the optical axis L is also shortened, causing a mobile device equipped with the optical imaging apparatus 200 capable of focusing to better meet requirements of thinning.

In the embodiments of FIG. 3A and FIG. 3B, the optical path changing element 280 is fixed to a housing 286. The housing 286 is fixed to the driving element 226 of the stabilization component 220. Therefore, a position of the optical path changing element 280 is fixed relative to the driving element 226.

Figure 4:
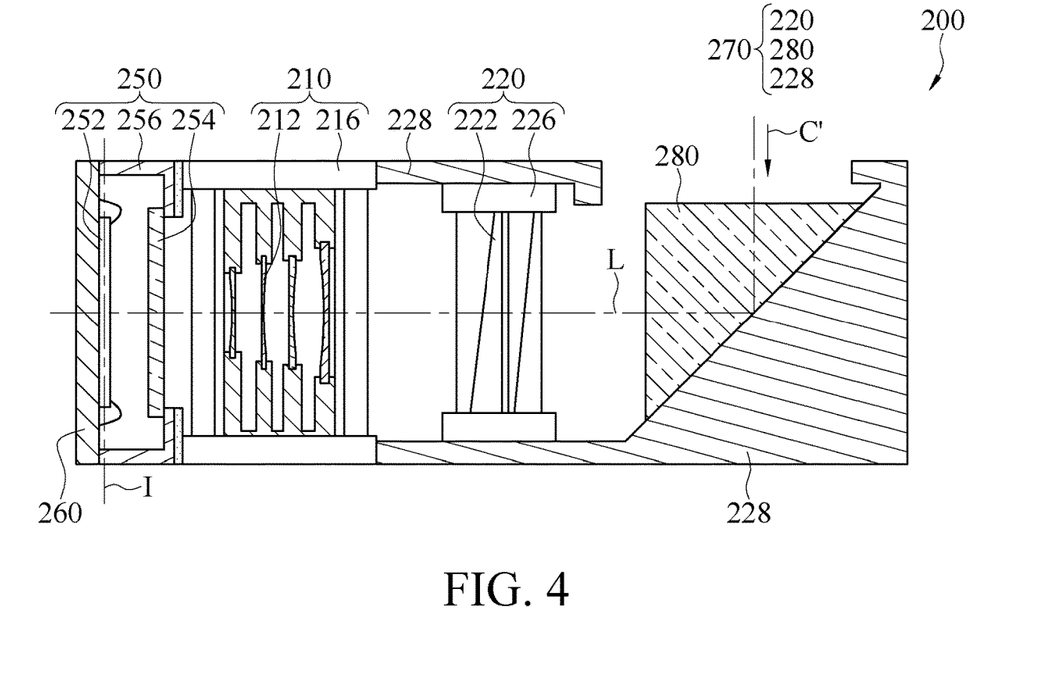
FIG. 4 is a schematic structural diagram of an optical imaging apparatus capable of focusing according to some embodiments.

Referring to FIG. 4, FIG. 4 is a schematic structural diagram of an optical imaging apparatus 200 capable of focusing according to some embodiments. The optical imaging apparatus 200 capable of focusing includes an image sensing component 250, a focusing component 210, a stabilization component 220, and an optical path changing element 280. The stabilization component 220 and the optical path changing element 280 are fixed to an assembly housing 228. In particular, the stabilizing optical lens group 222 is fixed to the driving element 226, the driving element 226 is fixed to the assembly housing 228, and the optical path changing element 280 is fixed to the assembly housing 228 (for example, as shown in FIG. 4, the assembly housing 228 may have a structure matching a shape of a side of the optical path changing element 280, and the optical path changing element 280 is fixed to the structure). Therefore, in this case, the stabilization component 220, the optical path changing element 280, and the assembly housing 228 may be regarded as an integrated assembly 270. During assembling, it is only required that the assembly 270 and the focusing component 210 are aligned with each other in an active alignment method. The remaining elements may be similar to the embodiment shown in FIG. 3A, and are not be repeated herein again.

Based on the foregoing, the present disclosure provides an optical imaging apparatus capable of focusing. By using a plurality of specific lens group structures in the apparatus, the apparatus can be easily assembled, and/or may achieve faster autofocus, and/or has optical image stabilization (OIS) and telephoto functions, so as to meet the demands of a high-specification mobile apparatus.

What is claimed is:

1. An optical imaging apparatus capable of focusing, comprising:
a lens group comprising:
a stabilization component having an optical axis, the stabilization component comprising a first optical lens group and a driving element, wherein the driving element is configured to drive the first optical lens group to rotate around the optical axis, wherein the stabilization component is not configured to change an image capturing direction of the optical imaging apparatus capable of focusing, wherein a lens of the first optical lens group has at least two areas, and a refractive index of each of the two areas are different from each other; and
a focusing component fixed to the stabilization component, the focusing component comprising a second optical lens group, wherein the second optical lens group is aligned with the optical axis; and
an image sensing component fixed to one of two ends of the lens group and aligned with the optical axis.

2. The optical imaging apparatus capable of focusing according to claim 1, further comprising an optical path changing element, wherein the optical path changing element is disposed at the other end of the two ends of the lens group away from the image sensing component and the optical path changing element is configured to change the image capturing direction of the optical imaging apparatus capable of focusing.

3. The optical imaging apparatus capable of focusing according to claim 2, wherein the optical path changing element is a reflective sheet, and an included angle between the reflective sheet and the image capturing direction is substantially the same as an included angle between the optical axis and the reflective sheet.

4. The optical imaging apparatus capable of focusing according to claim 2, wherein the optical path changing element is a prism, the prism has a light incident surface and a light emitting surface, the light incident surface is perpendicular to the image capturing direction, and the light emitting surface is perpendicular to the optical axis.

5. The optical imaging apparatus capable of focusing according to claim 2, further comprising an assembly housing, wherein the optical path changing element and the stabilization component are disposed in the assembly housing.

6. The optical imaging apparatus capable of focusing according to claim 1, wherein the second optical lens group is a movable optical lens group, and the focusing component further comprises an actuating element, wherein the movable optical lens group is disposed in the actuating element, the actuating element is configured to actuate at least one movable optical lens in the movable optical lens group to move along the optical axis.

7. The optical imaging apparatus capable of focusing according to claim 1, wherein the second optical lens group is a fixed optical lens group.

8. The optical imaging apparatus capable of focusing according to claim 7, wherein the driving element is further configured to drive the first optical lens group to move along the optical axis.

9. The optical imaging apparatus capable of focusing according to claim 1, wherein the focusing component further comprises an actuating element, a third optical lens group, and a frame body, the second optical lens group is a movable optical lens group, the movable optical lens group is disposed in the actuating element, the actuating element is configured to actuate at least one movable optical lens in the movable optical lens group to move along the optical axis, the third optical lens group is aligned with the optical axis and is a fixed optical lens group, the fixed optical lens group is fixed to the frame body, and the frame body is fixed to the actuating element.

10. The optical imaging apparatus capable of focusing according to claim 9, wherein a size of each lens in the movable optical lens group is less than a size of each lens in the fixed optical lens group.

11. The optical imaging apparatus capable of focusing according to claim 9, wherein the movable optical lens group and the fixed optical lens group are disposed in a single housing.

12. The optical imaging apparatus capable of focusing according to claim 1, wherein the focusing component is located between the stabilization component and the image sensing component.

13. The optical imaging apparatus capable of focusing according to claim 1, wherein the stabilization component is located between the focusing component and the image sensing component.

14. The optical imaging apparatus capable of focusing according to claim 1, wherein the image sensing component comprises an image sensor, a filter, and a fixing frame, the image sensor and the filter is fixed to the fixing frame, and the filter is configured to filter a light ray toward the image sensor along the optical axis.

\* \* \* \* \*